Figure 1:
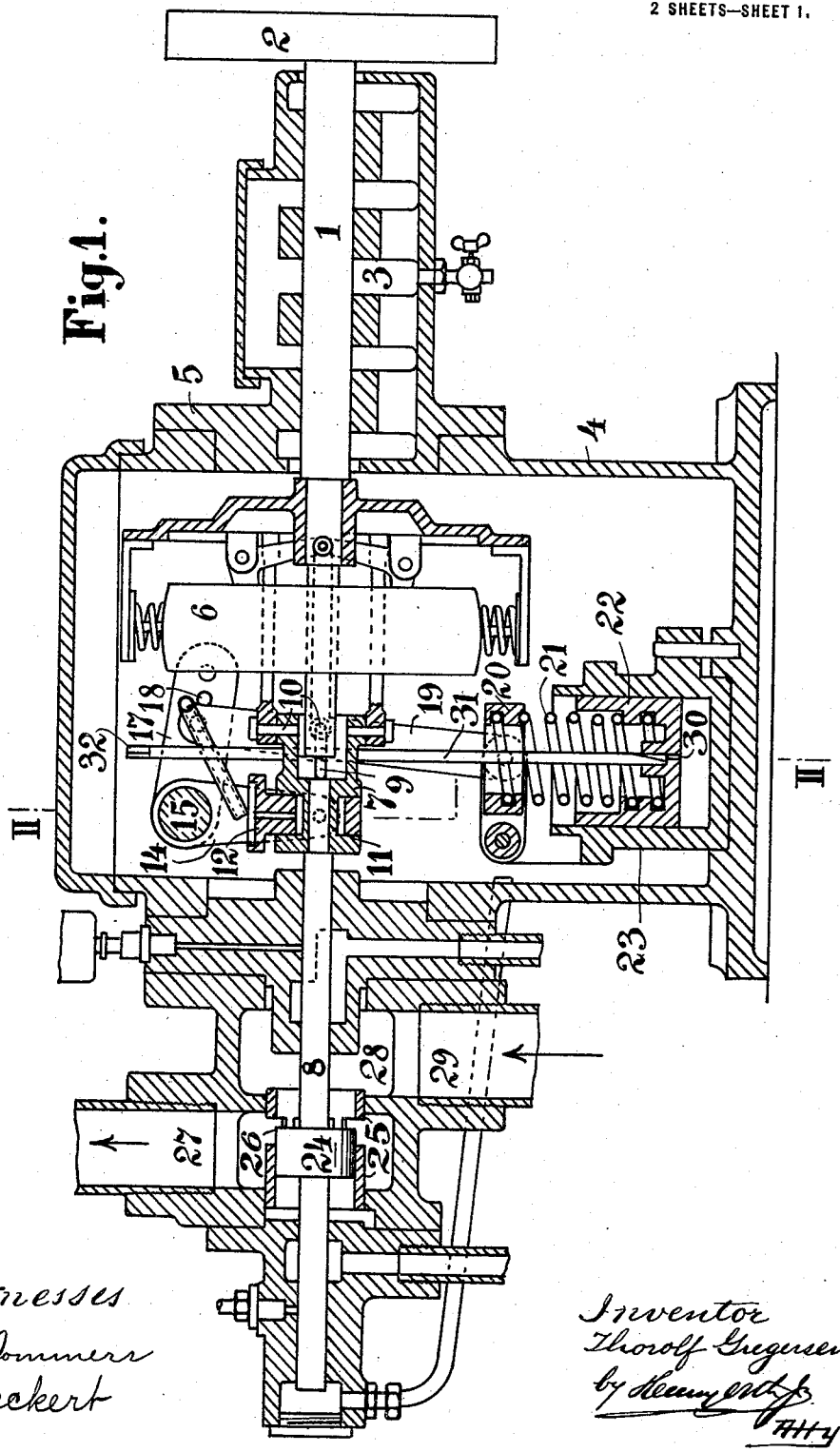

T. GREGERSEN.
GOVERNOR FOR WOOD GRINDERS.
APPLICATION FILED SEPT. 4, 1914.

1,149,439.

Patented Aug. 10, 1915.
2 SHEETS—SHEET 1.

Witnesses
B. Sommer
E. Leckert

Inventor
Thorolf Gregersen
by Heury Orth
Atty

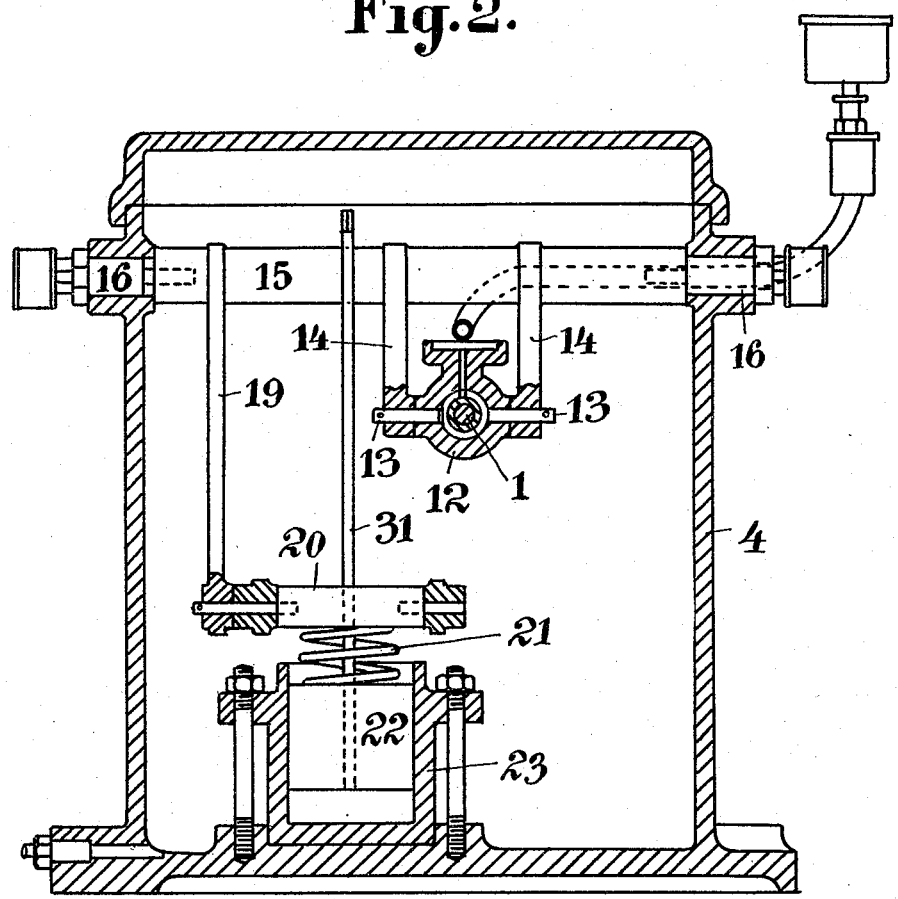

UNITED STATES PATENT OFFICE.

THOROLF GREGERSEN, OF NORSTRAND, NEAR CHRISTIANIA, NORWAY.

GOVERNOR FOR WOOD-GRINDERS.

1,149,439.   Specification of Letters Patent.   Patented Aug. 10, 1915.

Application filed September 4, 1914.  Serial No. 860,310.

*To all whom it may concern:*

Be it known that I, THOROLF GREGERSEN, a subject of the King of Norway, residing at Norstrand, near Christiania, Norway, have invented certain new and useful Improvements in Governors for Wood-Grinders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in governors particularly adapted for regulating the speed of a grinder by acting to reduce or increase the pressure on the pockets of the grinder.

The object of the invention is to provide a direct driven governor, which will act instantaneously and accurately to keep a constant speed and thus secure the full utilization of the power and prevent breaking of the stones.

The invention consists in the details of construction and combinations of parts, which are hereinafter described with reference to the drawings and more particularly set forth in the accompanying claims.

On the drawings: Figure 1 represents a longitudinal sectional view of a grinder governor constructed according to the invention. Fig. 2 is a sectional view on the line II—II of Fig. 1.

Referring now to the drawings: 1 indicates the governor shaft, which is driven direct from the grinder shaft (not shown) by means of a belt pulley 2. The shaft 1 is journaled in a bearing 3, which is fixed laterally on the casing 4 by means of a flange 5. On the inner end of the shaft 1 is mounted a centrifugal member 6. This centrifugal member 6 may be of any suitable known construction, which will serve to move a coupling sleeve 7 axially in accordance with the speed of the shaft 1. The coupling sleeve 7 is fast on a shaft 8 so that the said shaft 8 will be moved in a longitudinal direction, when the sleeve 7 is moved axially, and will at the same time follow the rotation of the sleeve. The connection between sleeve and the inner end of shaft 1 is formed by a longitudinal slot 9 in the sleeve forming a guide for a cross pin 10 on the shaft 1.

The coupling sleeve 7 is provided with an annular recess 11, in which is mounted a yoke 12, which will follow the sleeve 7 on its axial movement, but is prevented from rotating with the same. The yoke 12 is provided with laterally projecting pins 13 (see Fig. 2), by means of which it is connected to arms 14 fixed on a cross shaft 15 journaled in bearings 16 in the side walls of the casing 4. The shaft 15 also carries an arm 17 projecting horizontally or forming a substantially right angle with the arms 14, the arms 14 and 17 thus forming a bell crank lever. The arm 17 is provided at different distances from the shaft 15 with holes 18 for fixing by means of a pin the upper end of a rod 19 connected at its lower end, in the manner indicated on Fig. 2, with a pivoted annular member 20.

The annular member 20 is connected by means of a coiled spring 21 with a piston 22 of a dash-pot cylinder 23, the action of said dash-pot being to prevent overregulating of the governor. The space below the piston 22 is filled with a suitable liquid as oil, and a certain amount of oil is also found inside the piston itself, said piston being, as it will be noticed, formed as a cup. When the piston is moved, oil must pass from one side of the piston to the other through the small opening 30. This opening 30 is controlled by means of a rod 31 extending up above the governing mechanism and being provided on its upper end with a square head 32. By turning the rod 31, the area of the opening 30 is regulated.

The action of the dash-pot may be made more or less effective by fastening the upper end of the rod 19 at a longer or a shorter distance from the shaft 15. When the upper end of the rod 19 is connected with the hole 18 farthest from the shaft 15, the damping influence of the cataract 22, 23 and the spring 21 will be considerable, but the damping effect will decrease, when the active part of the arm 17 is shortened by using a hole nearer the shaft 15 for fixing rod 19.

On the shaft 8 is mounted a piston valve 24, which is adapted to slide in a sleeve or cylinder 25. Said sleeve or cylinder 25 is provided with slots 26 communicating with an outlet 27 for actuating fluid leading to the pockets of the grinder. The said slots 26 are partly covered by the rotating piston valve 24. At one end the sleeve or cylinder 25 opens into a chamber 28 indirect communication with an inlet 29 for actuating fluid. It will be seen that the actuating fluid can pass from the inlet 29 as indicated by arrows through chamber 28, cylinder 25, slots 26 and out through outlet 27.

When the speed of the coupling goes up the governor sleeve 7 will be caused by the centrifugal governor to travel to the left and will move the piston valve 24 in the same direction, thereby opening the slots 26 more, so that more actuating fluid can pass through the valve to increase the pressure on the pockets, until the grinder shaft has again assumed its normal speed. When the speed of the grinder and governor goes down, the valve 24 will be moved to the right, thereby covering part of the slots 26 and letting less actuating fluid through the valve. Thus the pressure on the pockets will decrease and the grinder will speed up until it has again reached its normal speed. Owing to the rotation of the piston valve 24 a very small effort is needed for moving the valve and therefore the governor is very sensitive. Owing to the construction of the spring and oil cataract the damping effect can be easily regulated so that the governor can be tuned up without difficulty to suit any construction and any size of grinder.

I claim—

1. A governor comprising a centrifugal member, a coupling rotatable and axially movable by said member, a bell crank lever mechanism having one arm connected with the coupling, a rod connected to the other arm of said mechanism, a fluid retarded piston, and a spring connection between the rod and piston, said rod being adjustable on the arm to which it is connected to vary the active length of the latter.

2. A governor comprising a driven shaft, a centrifugal member mounted thereon, a coupling sleeve rotatable and axially movable by said member, a yoke surrounding the coupling and axially movable thereby, a bell crank lever mechanism having one arm connected to the yoke, a rod adjustably connected to the other arm of said mechanism, a fluid retarded piston, and a spring connection between the rod and piston, said rod being adjustable on the arm to which it is connected to vary the active length of the latter.

3. A governor comprising a driven shaft, a centrifugal member mounted thereon, a coupling sleeve rotatable and axially movable by said member, a yoke surrounding the coupling and axially movable thereby, a bell crank lever mechanism having one arm connected to the yoke, a rod adjustably connected to the other arm of said mechanism, a stationary dash pot, a fluid therein, a hollow piston in the dash-pot communicating therewith through an aperture in its bottom, a spring seated in said piston, and a pivoted member connecting the spring and said rod.

4. A governor comprising a driven shaft, a coupling member connected to and rotatable with the shaft, a centrifugal member mounted on the latter and adapted to move the coupling axially according to the speed of the shaft, a yoke surrounding the coupling and movable axially thereby, a transverse rock shaft, arms fixed on the latter pivotally connected to the yoke, an operating arm fixed on the rock-shaft at an angle to the aforesaid arms, a rod pivotally connected at one end to the operating arm, a stationary dash-pot, a retarding liquid therein, a hollow piston in the dash-pot having an aperture in its bottom, means to regulate the size of the aperture, a spring seated in said piston, and a pivoted member connecting the spring to said rod.

In testimony that I claim the foregoing as my invention, I have signed my name in presence of two subscribing witnesses.

THOROLF GREGERSEN.

Witnesses:
M. E. CURTFORUDSEN,
C. F. HANSEN.

Copies of this patent may be obtained for five cents each, by addressing the "Commissioner of Patents, Washington, D. C."